United States Patent [19]

Katz

[11] Patent Number: 5,142,645
[45] Date of Patent: Aug. 25, 1992

[54] METHOD AND APPARATUS FOR GENERATING FRAUNHOFER LINE LASER SOURCE USING STIMULATED RAMAN SCATTERING

[75] Inventor: Daniel L. Katz, San Diego, Calif.

[73] Assignee: United States of America as represented by the Secretary of the Navy, Washington, D.C.

[21] Appl. No.: 701,394

[22] Filed: May 16, 1991

[51] Int. Cl.[5] ............................................. H03F 7/00
[52] U.S. Cl. ........................................ 359/327; 372/3
[58] Field of Search ............................ 372/3; 359/327

[56] References Cited

U.S. PATENT DOCUMENTS

| | | | |
|---|---|---|---|
| 4,136,318 | 1/1979 | Kruse, Jr. ........................... | 331/94.5 |
| 4,145,668 | 3/1979 | Mastrup et al. .................... | 331/94.5 |
| 4,280,109 | 7/1981 | Stappaerts ......................... | 331/94.5 |
| 4,570,081 | 2/1986 | Baldwin ............................. | 359/327 |
| 4,633,103 | 12/1986 | Hyman et al. ..................... | 359/327 |
| 4,717,842 | 1/1988 | Komine .............................. | 359/327 |
| 5,033,051 | 7/1991 | Werner ............................... | 372/3 |

OTHER PUBLICATIONS

Komine, "Stimulated Vibrational Ramen Scattering in HD", IEEE Journal of Quantum Electronics, vol. QE-22, No. 4, Apr. 1986, pp. 520-521.
Kerr, "Fraunhofer Filters to Reduce Solar Background for Optical Communications", Optical Engineering, vol. 28, No. 9, Sep. 1989, pp. 963-968.
Lou, "Research on the Characteristics of $H_2$ Raman Conversion Pumping by a 1-J XeCl Excimer Laser", J. Appl. Phys., 66(6), 15 Sep. 1989, pp. 2265-2273.
Komine et al., "Higher-Stokes-Order Raman Conversion of XeCl Laser in Hydrogen", Optics Letters, vol., No. 4, Apr. 1982, pp. 157-158.
Newton et al., "Numerical Model of Multiple-Raman-Shifting Excimer Laser to the Blue-Green in $H_2$," Optics Letter, vol. 6, No. 3, Mar. 1981, pp. 125-127.
Scott et al., "Efficient Raman Energy Extraction in HD", Applied Optics, vol. 29, No. 15, May 20, 1990, pp. 2217-2218.

*Primary Examiner*—Georgia Y. Epps
*Attorney, Agent, or Firm*—Harvey Fendelman; Thomas G. Keough; Michael A. Kagan

[57] ABSTRACT

The present invention provides an apparatus and method for generating blue laser light having a wavelength corresponding to a solar Fraunhofer line. The blue laser light is at a frequency that has both excellent transmissibility through sea water and a high signal-to-noise ratio. A first laser beam, generated using an injection-locked excimer XeCl laser, is down-converted by a first-Stokes order shift of $2 \times 4155$ cm$^{-1}$ in a first Raman cell containing $H_2$ gas at a pressure of about 10 atmospheres. The output of the first Raman cell is down-converted by a first Stokes shift of 3628 cm$^{-1}$ in a second Raman cell containing HD at a pressure of about 10 atmospheres so that the output of the second Raman cell has a wavelength of 486.366 nm. This wavelength corresponds to the FE I solar Fraunhofer line.

18 Claims, 1 Drawing Sheet

METHOD AND APPARATUS FOR GENERATING FRAUNHOFER LINE LASER SOURCE USING STIMULATED RAMAN SCATTERING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to frequency conversion of laser radiation. In particular, the present invention uses Raman scattering to convert the output of a laser to radiation having a frequency corresponding to a solar Fraunhofer line in the blue region of the electromagnetic spectrum.

There are many applications where it is desirable to communicate through sea water. Because sea water is most transparent in the blue-green region of the electromagnetic spectrum, light falling within this region can be used as a communication medium. Generally, blue-green light is light having a wavelength from 420–540 nm. Light having a wavelength of about 480 nm has optimal transmissibility in sea water. One approach for generating blue-green light is to direct the output of an excimer laser through a Raman cell using atomic vapors such as Pb or Ba. Another technique employs multiple Stokes shifting (i.e. nonresonant vibrational Raman scattering) in molecular gases such as $H_2$ at several atmospheres of pressure. The main limitation of the former approach is the material problems associated with the high temperature required to maintain the necessary atomic vapor density. The latter approach avoids the disadvantages of the former method, but does not yield a particularly advantageous blue-green wavelength very near the wavelength of maximum optical transmittance in sea water.

A significant problem associated with a blue-green carrier is that the solar background represents a source of noise. In fact, per unit wavelength interval, the solar output is a maximum at approximately 500 nm, which is in the middle of the blue-green portion of the electromagnetic spectrum. Therefore, a need exists for a method of generating a light signal having optimal transmission characteristics in sea-water, while limiting the noise attributable to solar radiation.

SUMMARY OF THE INVENTION

The present invention provides an apparatus and method for generating blue laser light having a wavelength corresponding to a solar Fraunhofer line. The blue laser light is at a frequency that has both excellent transmissibility through sea water and a high signal-to-noise ratio. In the present invention, a laser beam is downshifted by Raman scattering in one or more Raman cells to provide a laser beam having a wavelength corresponding to a solar Fraunhofer line in the blue-green region of the electromagnetic spectrum.

In one embodiment of the present invention, a first laser beam, generated using an injection-locked excimer XeCl laser, is down-converted by a second-Stokes order shift of $2 \times 4155$ cm$^{-1}$ in a first Raman cell containing Hz gas at a pressure of about 4 to 10 atmospheres. The output of the first Raman cell is down-converted by first Stokes shift of 3628 cm$^{-1}$ in a second Raman cell containing HD at a pressure ranging from about 4 to 10 atmospheres so that the output of the second Raman cell has a wavelength of 486.366 nm. This wavelength corresponds to a strong Fe I solar Fraunhofer line. A second embodiment a series of three Raman cells where two of the cells are filled with molecular gas ($H_2$) and one cell is filled with hydrogen deuteride gas (HD). Gas pressure in the cells is preferably about 4 to 10 atmospheres.

The invention offers the advantage of providing an optical beam having excellent transmissibility properties through sea water and a high signal to noise ratio. Another advantage of the present invention is that it avoids serious materials problems such as the chemical compatibility problems associated with high temperature metal vapor Raman cells.

DESCRIPTION OF THE PREFERRED EMBODIMENT

The present invention provides a practical apparatus and method of converting laser energy at one frequency to laser energy having a wavelength corresponding to a solar Fraunhofer line in order to generate an optical signal with a good signal to noise ratio at an essentially optimum wavelength for underwater communications and surveillance. Blue light having a wavelength of 486.366 nm has two main advantages for underwater communications applications. First, 486.366 nm corresponds to a strong Fraunhofer line (Fe I) due to resonant scattering by atomic iron in the atmosphere of the sun. Thus, a blue optical beam operating at this wavelength is less susceptible to noise associated with the solar background. Such noise would be reduced by about a factor of three compared to that at a nearby wavelength not corresponding to a Fraunhofer line. Second, for sea water, 486.366 nm is very near the wavelength of maximum optical transmittance (minimum attenuation).

Figure 1:
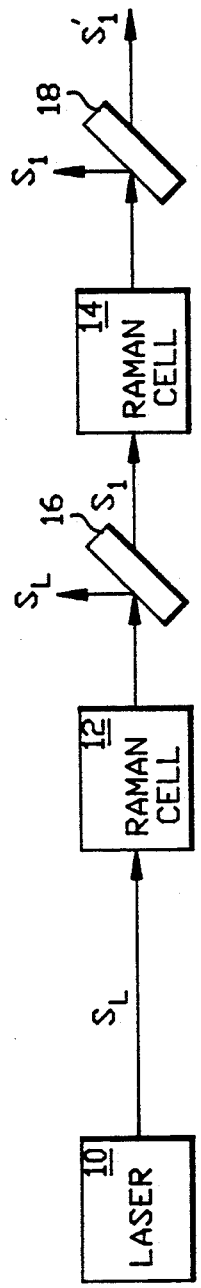
FIG. 1 is block diagram of the present invention representing downshifting of laser energy using two Raman cells.

The technique employed by the present invention is based on nonresonant vibrational Raman scattering. Referring to FIG. 1, pump laser 10 provides a pump laser beam, $S_L$, that is directed through a first Raman cell 12 where the beam undergoes stimulated Raman scattering (SRS) to produce Stokes radiation $S_1$. In the preferred embodiment, pump laser 10 would preferably be an XeCl excimer laser because such a laser provides a high power output at a wavelength of 307.7 nm. This particular wavelength is desirable because it may be conveniently down-converted to a beam having a desired wavelength. In this embodiment, the bandwidth of the excimer laser should be tuned to a bandwidth of about 0.01 nm so that the optical output of the present invention will have a wavelength narrower than the corresponding Fraunhofer line.

Techniques for generating such a beam are well known. One suitable technique is injection control where a relatively low power laser oscillator generates a tuned seed signal that is injected into a high power laser amplifier. By way of example, tuning the low power laser oscillator may be accomplished by means of intra-cavity etalons. A course etalon, with a free spectral range on the order of the XeCl laser tuning range, is used to select the 0-1 laser line. One or more fine etalons can then be employed to provide a precise, narrow-line output. Linear polarization of the output can be accomplished by inserting optical flat 13 at Brewster's angle in the low power laser oscillator. An example of a type of laser suitable for use in the present invention is the Hyperex-400 Series manufactured by Lumonics, Inc., Kanata (Ottawa), Ontario, Canada.

After exiting cell 12, the $S_1$ radiation passes through second Raman cell 14, where it acts as a pump beam to generate first Stokes $S'_1$ emission having the desired wavelength, which in one example of the preferred embodiment is 486.366 nm. Filter 16, may be interposed between Raman cells 12 and 14 to transect Stokes radiation $S_1$, reject any radiation $S_1$ that is not converted to second Stokes radiation in cell 12. The $S'_1$ radiation then exits cell 14. Filter 18 may be positioned to transect the output of the second Raman cell 14 in order to filter any $S'_1$ light that is not Raman shifted to the desired frequency. By way of example, filters 16 and 18 may be dichroic elements. By way of example, the generation of a first Stokes emission in one of either Raman cells 12 or 14, and a second Stokes emission in the other Raman cell may, for example, be accomplished by suitable variation of the input beam intensity, cell length and/or gas pressure. Raman cells 12 and 14 are employed at room temperature.

Construction of Raman cells is well known by those skilled in this art. In the preferred embodiment, they would be constructed of stainless steel tubing about 1 meter in length and 1 cm in diameter, and have flanges with fused silica or quartz windows. The windows should be oriented at Brewster's angle to pass linearly polarized light without Fresnel losses (i.e., losses due to reflection).

Either one of Raman cells 12 or 14 may contain gas of the heteronuclear molecule, HD (hydrogen deuteride); the other cell contains ordinary, homonuclear hydrogen gas, $H_2$. The cell containing $H_2$ provides a second Stokes shift of $2 \times 4155$ cm$^{-1}$ and the cell containing HD provides a single Stokes shift of 3628 cm$^{-1}$. By way of example, if cell 12 were to contain $H_2$, it would convert the output of laser 10 to a Stokes (previously referenced as "$S_1$") of 413.4 nm; and if cell 14 were to contain HD, it would provide a single Stokes shift that would convert the $S_1$ wave 486.366 nm. The maximum energy conversion efficiency would be the ratio (307.7 nm)/(486.366 nm) which is equivalent to 63%. The particular serial order of cells 12 and 14 is not fundamentally important. Successful frequency conversion of the $S_L$ beam would occur just as effectively if cell 12 were to contain HD and cell 14 contained $H_2$.

Figure 2:
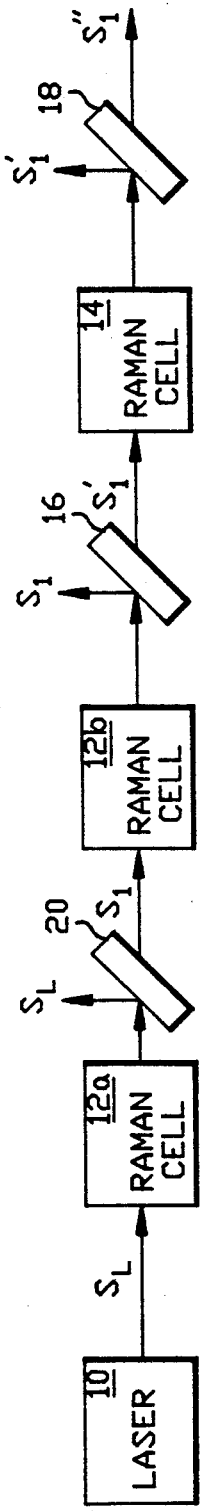
FIG. 2 is block diagram of a second embodiment of the present invention representing downshifting of laser energy using three Raman cells.

In a second embodiment of the present invention, the cell containing $H_2$ could be replaced with Raman cells 12a and 12b in series, as shown in FIG. 2, where cells 12a and 12b each contain $H_2$ gas so as to provide a single Stokes shift of 4155 cm$^{-1}$. In this embodiment, cells 12a and 12b are in series with cell 14 containing HD gas. It is to be understood that the serial order of these cells may be varied other than as specifically described herein.

By way of example, gas pressure in each Raman cell may range from approximately 4 to 10 atmospheres.

Figure 3:
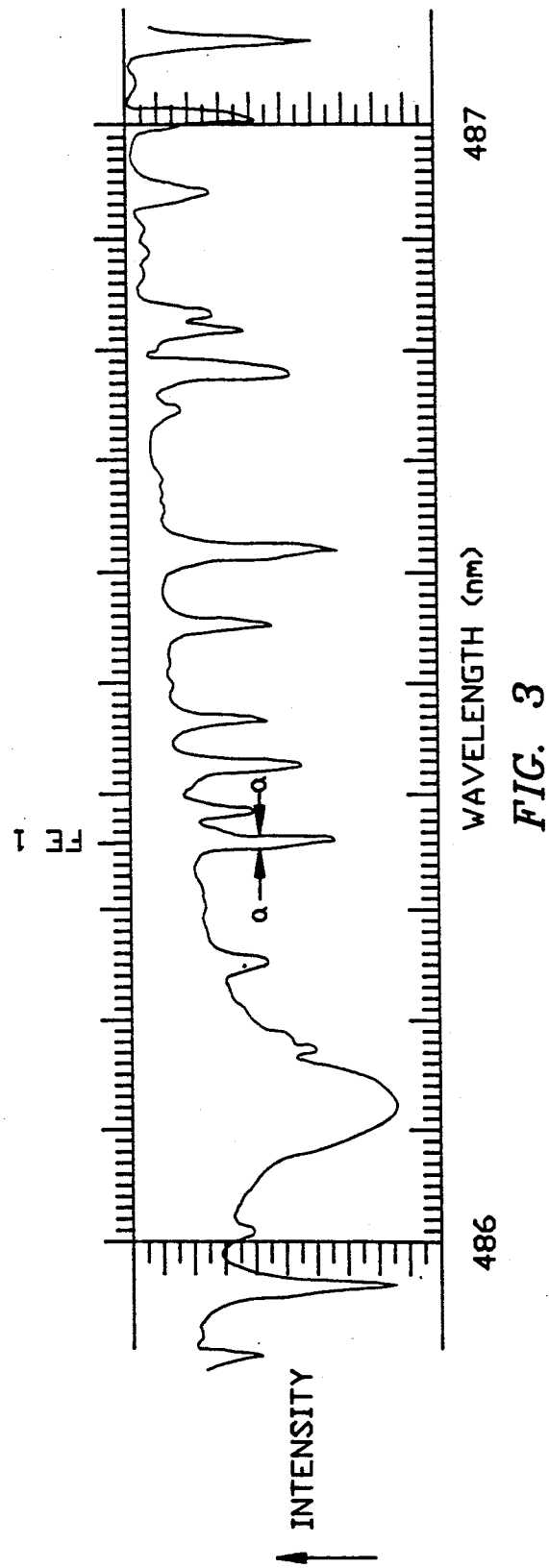
FIG. 3 is a graph of the intensity of solar irradiance as a function of wavelength showing a Fraunhofer line in the blue-green region of the electromagnetic spectrum.

Linear laser polarization should provide efficient Raman conversion on the 0-1 vibrational transition in $H_2$ and HD. Applying the combined shift of 11,938 cm$^{-1}$ to the 0-1 line of an XeCl laser tuned to 307.7 nm would yield a blue output at 486.366 nm. If the output of laser 10 has a bandwidth of 0.01 nm, the bandwidth of the system output would be less than 0.015 after the Stokes conversions. A wavelength of 486.366 is particularly advantageous because it falls within the FE I Fraunhofer line having a wavelength of 486.366 nm and a FWHM (the full width, half maximum) bandwidth of about 0.015 nm, indicated with dimension lines a—a, as shown in FIG. 3. Thus, in addition to being near the maximum wavelength for optical transmission through sea water, the output of the present invention corresponds to a relative minimum in the solar background. Both these factors are advantageously employed by the present invention to provide an effective and efficient underwater optical communications medium having a wavelength with a high signal to noise ratio.

Obviously, many modifications and variations of the present invention are possible in light of the above teachings. It is therefore to be understood that within the scope of the appended claims, the invention may be practiced otherwise than as specifically described. For example, it is to be understood that the scope of the invention comprehends the conversion of laser light to light having a wavelength corresponding to any Fraunhofer line in the blue-green portion of the electromagnetic spectrum. The specific examples of the wavelength and bandwidth of the output of laser 10, and the particular type of laser described above, as well as the particular gasses employed in Raman cells 12 and 14 are provide by way of example only, and should not be construed as limiting the scope of the claims. In light of the above teachings, the invention may also be practiced by employing any integral number of Raman cells filled with gasses other than those specified by way of example above which would ultimately yield an optical beam having a wavelength corresponding to any Fraunhofer line in the blue-green portion of the electromagnetic spectrum.

I claim:

1. An apparatus for generating laser light having a wavelength corresponding to a solar Fraunhofer line in the blue-green region of the electromagnetic spectrum, comprising:
   a laser for producing a first laser beam;
   first cell means filled with a first gas transparent to said first laser beam and positioned to receive said first laser beam for providing a Raman shifted second laser beam; and
   second cell means filled with a second gas transparent to said second laser beam gas and positioned to receive said second laser beam for providing a Raman shifted third laser beam having a wavelength corresponding to a solar Fraunhofer line within the blue-green region of the electromagnetic spectrum.

2. The apparatus of claim 1 wherein:
   said third wavelength is 486.366 nm.

3. The apparatus of claim 2 wherein:
   said first laser beam has a wavelength of 307.7 nm.

4. The apparatus of claim 3 wherein:
   said first cell means contains molecular hydrogen gas at a pressure of about 4 to 10 atmospheres and provides a second Stokes-shift of $2 \times 4155$ cm$^{-1}$; and said second cell means contains hydrogen deuteride gas at a pressure of about 4 to 10 atmospheres and provides a Stokes-shift of 3628 cm$^{-1}$.

5. The apparatus of claim 4 wherein:
said laser is an injection locked XeCl laser.

6. The apparatus of claim 3 wherein:
said first cell means is a Raman cell containing hydrogen deuteride gas at a pressure of about 4 to 10 atmospheres and provides a Stokes-shift of 3628 cm$^{-1}$; and
said second cell means is a Raman cell containing molecular hydrogen gas at a pressure of about 4 to 10 atmospheres and provides a Stokes-shift of $2 \times 4155$ cm$^{-1}$.

7. The apparatus of claim 6 wherein:
said laser is an injection locked XeCl laser.

8. A method for generating laser light having a wavelength corresponding to a solar Fraunhofer line in the blue-green region of the electromagnetic spectrum, comprising the steps of:
producing a first laser beam having a first wavelength;
producing a second laser beam from said first laser beam by stimulated Raman scattering where said second laser beam has a second wavelength not equal to said first wavelength; and
producing a third laser beam from said second laser beam by stimulated Raman scattering where said third wavelength corresponds to a solar Fraunhofer line within the blue green-region of the electromagnetic spectrum.

9. The method of claim 1 wherein: said third wavelength is 486.366 nm.

10. The method of claim 2 wherein: said first laser beam has a wavelength of 307.7 nm.

11. The method of claim 10 wherein:
the step of producing said second laser beam is accomplished by passing said first laser beam through a first Raman cell containing molecular hydrogen gas at a pressure of about 4 to 10 atmospheres to provide a Stokes-shift of $2 \times 4155$ cm$^{-1}$; and
the step of producing said third laser beam is accomplished by passing said second laser beam through a second Raman cell containing hydrogen deuteride gas at a pressure of about 4 to 10 atmospheres to provide a Stokes-shift of 3628 cm$^{-1}$.

12. The apparatus of claim 11 wherein:
said first laser beam is generated by an injection locked XeCl laser.

13. The method of claim 10 wherein:
the step of producing said second laser beam is accomplished by passing said first laser beam through a first Raman cell containing hydrogen deuteride gas at a pressure of about 4 to 10 atmospheres to provide a Stokes-shift of 3628 cm$^{-1}$; and
the step of producing said third laser beam is accomplished by passing said second laser beam through a second Raman cell containing molecular hydrogen gas at a pressure of about 4 to 10 atmospheres to provide a Stokes-shift of $2 \times 4155$ cm$^{-1}$.

14. The apparatus of claim 13 wherein:
said first laser beam is generated by an injection locked XeCl laser.

15. An apparatus for generating laser light having a wavelength corresponding to a solar Fraunhofer line in the blue-green region of the electromagnetic spectrum, comprising:
a laser for producing a first laser beam;
cell means filled with a gas transparent to said first laser beam and positioned to receive said first laser beam for providing a Raman shifted second laser beam having a wavelength corresponding to a solar Fraunhofer line within the blue-green region of the electromagnetic spectrum.

16. The apparatus of claim 15 wherein:
said second laser beam has a wavelength of 486.366 nm.

17. The apparatus of claim 16 wherein:
said first laser beam has a wavelength of 307.7 nm.

18. The apparatus of claim 17 wherein:
said laser is an injection locked XeCl laser.

* * * * *